United States Patent [19]

Lentz, deceased

[11] Patent Number: 4,875,917

[45] Date of Patent: * Oct. 24, 1989

[54] METHOD FOR MAKING A LAYERED GLASS ARTICLE

[75] Inventor: William P. Lentz, deceased, late of Addison, N.Y., by Cornelia V. Lentz, executrix

[73] Assignee: Corning Incorporated, Corning, N.Y.

[*] Notice: The portion of the term of this patent subsequent to Nov. 15, 2005 has been disclaimed.

[21] Appl. No.: 173,725

[22] Filed: Mar. 25, 1988

Related U.S. Application Data

[62] Division of Ser. No. 925,787, Oct. 31, 1986, Pat. No. 4,784,679.

[51] Int. Cl.[4] .................. C03C 25/02; C03B 5/26; C03B 7/14; B29D 11/00
[52] U.S. Cl. ..................... 65/3.11; 65/3.13; 65/121; 65/145; 264/1.7
[58] Field of Search .................. 65/3.11, 3.13, 6, 8, 65/71, 121, 134, 145; 264/1.7, 2.2, 501, 535, 174, 69

[56] References Cited

U.S. PATENT DOCUMENTS

| | | | |
|---|---|---|---|
| 2,052,269 | 8/1936 | Woods | 65/145 |
| 3,445,216 | 5/1969 | Keefer et al. | 65/145 |
| 3,507,940 | 4/1970 | Gard | 264/71 |
| 3,507,946 | 4/1970 | Gard | 264/122 |
| 3,551,955 | 1/1971 | Gard et al. | 18/30 |
| 3,573,024 | 3/1971 | Golozubov et al. | 65/145 |
| 3,614,197 | 10/1971 | Nishizawa et al. | 350/96 |
| 3,725,025 | 4/1973 | Gimenez | 65/134 |
| 3,819,350 | 6/1974 | Pellett et al. | 65/134 |
| 3,823,995 | 7/1974 | Carpenter | 350/96 |
| 4,118,212 | 10/1978 | Aulich et al. | 65/3.14 |
| 4,145,200 | 3/1979 | Yamazaki et al. | 65/3.14 |

Primary Examiner—David L. Lacey
Assistant Examiner—L. Johnson
Attorney, Agent, or Firm—Kees van der Sterre

[57] ABSTRACT

Layered glass products such as multilayer glass rods or fibers are formed in a preferably continuous process wherein at least two component glasses are supplied to an annular mixing zone wherein relative movement of the annular surfaces produces spiral layering of the glasses and the formation of a glass product stream having a preselected gradient in composition and glass properties across a diameter thereof.

8 Claims, 4 Drawing Sheets

METHOD FOR MAKING A LAYERED GLASS ARTICLE

This is a division of application Ser. No. 925,787, filed 10/31/86, now U.S. Pat. No. 4,784,679.

BACKGROUND OF THE INVENTION

The present invention relates to glass articles comprising multiple layers of glass, and to a method for manufacturing such articles. The method is useful for processing viscous glass melts, and in preferred embodiments, permits the continuous forming of a multilayer or graded-index glass product from multiple feed streams of molten glass.

Glass manufacturing processes wherein multiple glass streams are supplied to forming apparatus for the manufacture of layered glass are well known. For example, U.S. Pat. No. 2,052,269 describes apparatus for forming thermometer tubing comprising multiple glass layers or components wherein a primary molten glass and a secondary contrasting molten glass are simultaneously fed to a drawing orifice configured so that a stripe of the contrasting glass is embedded in the primary glass as glass capillary tubing for thermometers or the like is drawn. Nozzles for the two glasses within the drawing orifice may be shaped to control the cross sections of the contrasting and primary tubing glass to form finished tubing suitable for various instrumentation applications. U.S. Pat. No. 3,573,024 describes modified apparatus suitable for drawing similar capillary tubing but being designed to avoid the introduction of seeds or air bubbles in the contrasting glass for the capillary stripe.

Diverse streams of molten glass have also been combined for the purpose of producing colored glass products. However, in this case, the positioning of the stream of secondary colorant glass within the primary glass stream is relatively unimportant, the objective being to achieve thorough mixing of the colorant glass in the primary glass in order to provide a homogeneously colored glass product. U.S. Pat. No. 3,445,216 describes apparatus and methods for providing colored glasses using a secondary stream of highly colored glass produced by melting a glass color frit. The combined glass streams traverse multiple stirring stations wherein thorough mixing of the streams to obtain color homogeneity in the final mixed glass feed stream is achieved. The stirring or mixing stations utilize rotating mixers of paddle or screw design to obtain shear mixing of the glass flowing around and past the stirrers.

Stirring apparatus for insuring homogeneity in glass melting operations producing large volumes of glass at high melting rates has also been highly developed. U.S. Pat. No. 3,725,025, for example, describes stirring apparatus wherein a glass feed stream is subdivided into multiple small feed streams which are mixed by shearing between the faces of opposed, relatively rotatable disc elements. U.S. Pat. No. 3,819,350 describes apparatus for melting glass at a high rate wherein homogenization of the glass is accomplished by shear mixing in an annular mixing region formed by a rotating cylinder and the cylindrical side walls of the mixing chamber. In both cases, the shearing of the molten glass is continued for a time sufficient to obtain thorough mixing and homogenization of the glass supplied to the mixing zone, so that glass exhibiting the mixing zone will not exhibit cords or other glassy inclusions which would impart non-uniform refractive index or other chemical or physical properties in glass articles produced therefrom.

Glass products exhibiting nonuniform physical properties such as refractive index gradients or the like are becoming increasingly important in fields of optical technology. Of particular commercial importance has been the development of glass optical fibers useful for transmitting information optically at high rates over long distances following the path of the optical fiber. Present-day glass optical fibers are drawn from glass preforms in which radial refractive index gradients and/or other, more complex radial refractive index distributions have been generated.

A common technique for manufacturing glass preforms for optical fibers or the like involves forming multiple layers of glass on a starting member or bait, generating the desired refractive index profile as the various layers of glass are applied. U.S. Pat. No. 3,823,995 describes one such method for making a multilayer glass article wherein glass layers of desired refractive index are sequentially deposited on the glass preform as fine particles of glass of appropriate composition.

Glass layering processes such as utilized for these and other optical applications are most frequently accomplished in a batch mode, i.e., by the fabrication of discrete preforms which must then be further processed in multiple stages to provide the finished product. However, alternative methods for continuously making graded-index optical devices from molten glass have been developed, as shown for example in U.S. Pat. No. 3,407,186. In that patent, multiple glass melts are prepared and simultaneously supplied to a forming orifice comprising concentric annular outlets for forming multiple-layer glass rod or fiber.

The latter approach to the manufacture of multilayer glass products requires the melting of multiple glass melts of differing composition, and becomes increasingly complex as the number of glasses required for article manufacture increases. The method of U.S. Pat. No. 3,823,995, supra, permits the generation of more complex refractive index profiles, but is generally limited to non-continuous manufacture.

U.S. Pat. Nos. 3,507,940, 3,507,946 and 3,551,955 describe a mixing procedure for producing articles incorporating a two- or three-dimensional dielectric constant gradient wherein adjacent shaped charges of particulate material are stirred to achieve controlled intermingling of the charges. Again, however, the method is limited to non-continuous manufacture and the stirring procedures employed are likely to generate turbulent and/or secondary flows and loss of fine structure in viscous liquid materials such as glasses.

It is therefore a principal object of the present invention to provide an improved method for the fabrication of multilayer glass articles.

It is a further object of the invention to provide a method for the manufacture of multilayer or graded-refractive-index glass articles using two or a relatively small number of different glass compositions.

It is a further object of the invention to provide glass products such as glass rod, tubing, or fiber exhibiting a predetermined non-uniform radial composition profile.

Other objects and advantages of the invention will become apparent from the following description thereof.

SUMMARY OF THE INVENTION

The present invention comprises a process by which two or more glasses, or other materials in viscous liquid form, may be combined and processed into products having any desired radial variation in composition by a controlled mixing procedure. As a consequence of non-uniform radial composition profile, the mixed material can exhibit a desired radial variation in one or more chemical or physical properties such as refractive index, density, electrical resistivity, chemical durability or other property.

Broadly characterized, the method of the invention involves mixing two or more plastically deformable or hardenable viscous liquid materials, typically molten glasses or liquid glass-forming compositions, to obtain controlled layering of the liquids in a spiralling configuration termed scrolling. Layering is achieved when, for example, a composite viscous liquid charge, made up of discrete individual viscous liquid charges of differing composition appropriately disposed within the composite charge, is introduced into a mixing region comprising a gap between opposing surfaces wherein the composite charge can be sheared between surfaces. The opposing surfaces are generally adapted for relative rotation with respect to each other, and the relative rotation forms interleaved spiral layers of the component liquid charges within the composite charge, so that a processed composite charge comprising a layered structure is produced. This layered charge is then removed from the mixing zone and further shaped or treated as desired. Hardening of the layered material, e.g. cooling of molten glass, can be effected before or after removal from the mixing zone depending upon the nature of further processing or the intended use of the product.

As hereinafter more fully described, appropriate distribution of the component charges within the composite charge simply requires that at least one of the component charges is so disposed within the shear-mixing gap that it is drawn out and redistributed in the direction of shear as shearing in the mixing zone commences. With continued rotational movement of one or both of the shearing surfaces, the sheared component continues to be redistributed about the axis of rotation, being transformed into spiral layers of increasing number and decreasing thickness alternating with layers of other material situated at the same lateral position between the shearing surfaces.

In a preferred embodiment, the invention includes a preferably continuous method for the manufacture of a glass article having a graded or stepped composition profile wherein two or more viscous liquid glass-forming compositions, typically molten glasses, are combined into a composite glass feed stream and introduced into a vertical mixing zone for shear mixing. The vertical mixing zone comprises an annular gap between opposing closed surfaces, at least one of the surfaces being rotatable with respect to the other about an axis of rotation coincident with its axis of symmetry. The rotatable surface is typically a closed curved surface, e.g. a cone or cylinder, which can rotate without causing turbulence in the mixing zone.

In the composite feed stream as introduced into the mixing zone, the component streams are geometrically distributed such that the relative proportions of at least two of the component streams vary as a function of radial distance from the axis of rotation, and generally also as a function of angular position about the axis of rotation. This provides a distribution wherein layering and circumferential redistribution of the components about the rotation axis can occur.

The surfaces of the mixing zone are then rotated with respect to each other while in contact with the composite feed stream to cause shearing and transport of the component liquids about the axis of rotation. The effect of this rotation is to cause spiral layering of the distributed component feed streams about the axis of rotation, the spirals having the same number of turns as the number of relative rotations of the rotatable mixing zone surfaces. This rotation, or so called scrolling, can be continued until the desired number of spiral layers have been generated.

After the desired mixing has been completed, relative rotation is terminated and/or the processed glass is withdrawn from the mixing zone. The processed glass withdrawn from the mixing zone can then be formed into glass products, typically multilayer or graded index glass rod or fiber, but alternatively pressed or otherwise formed glass products wherein the layering can be disposed in any desired orientation within the formed article.

The described scrolling technique can involve relatively few rotations of the mixing surfaces to provide relatively few spiral turns, or a large number of rotations can be used to obtain extremely fine layering, such that discernment of the individual layers by ordinary optical analysis techniques becomes impossible. In the latter circumstance, the process has effected a thorough redistribution or homogenization of the component glasses circumferentially about the rotation axis, so that the initial variations in composition with angular position about the axis can no longer be detected. However, compositional gradients or step variations impressed radially of the rotation axis, by the predetermined glass distribution within the composite feed stream, are retained so that a predetermined composition profile across the diameter of the feed stream can be generated in the product.

Advantageously, the composition profiles across the transverse dimension of the product can be essentially arbitrary, limited only by the degree to which material transport within the mixing zone in directions transverse to the direction of relative movement of the mixing surfaces can be suppressed. The process offers additional advantages in that the nature of the redistribution mechanism insures concentricity of the final profile about the rotation axis. Further, if desired, the glasses to be used can be selected with diffusible constituents which speed the process of fine layer dissolution and glass homogenization, so that the processing time needed to achieve a completely smooth index gradient can be reduced.

Whereas the invention has primary application to the manufacture of multilayer products wherein only glasses are used to form the various product layers, layering of other materials within a glass envelope or multilayer construction, such as metal or crystalline ceramic layers or the like, is also possible. The only requirement of such alternative material is amenability to processing in a viscous liquid form, compatible with the glass-forming composition or other component liquid to be processed as above described. Further, the scrolling method is not limited to the layering of only two glasses or other viscous liquids, but rather can be extended to the use of three or more component liquid in the mixing zone to provide layered products of more complex composition. Thus the invention has application to the manufacture of layered glass-metal composites such as glass-metal capacitors, in addition to multilayer all-glass products of complex configuration.

DESCRIPTION OF THE DRAWING

The invention may be further understood by reference to the drawings wherein.

DETAILED DESCRIPTION

The present invention has primary application for the manufacture of multilayer glass articles from two or more feed streams of molten glass, and the following description will refer to such applications as preferred embodiments of the invention. However such description is for purposes of illustration only, and is not intended to be limiting.

Referring to the manufacture of multilayer glass articles such as rod or tubing, the initial or starting composite glass feed stream is conveniently provided by combining two or more smaller component streams of molten glass, and then introducing this composite feed stream into an annular mixing zone bounded by inner and outer curved surfaces. These curved surfaces can be rotatably moved with respect to each other by rotation of one or both about a common rotation axis.

Figure 1:
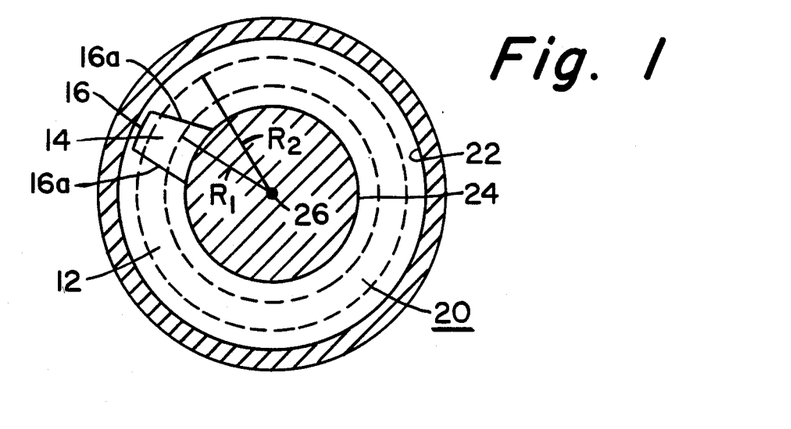
FIG. 1 is a schematic illustration in cross section of a composite glass feed stream to be provided for layering in accordance with the invention.

One possible configuration for such a composite feed stream and mixing zone is illustrated in FIG. 1 of the drawing. Referring to FIG. 1, there is schematically shown in cross section an annular mixing zone 20 bounded by outer curved surface 22 and inner curved surface 24 wherein is disposed a composite glass feed stream. The composite glass feed stream is made up of a first discrete component feed stream 12 and a second discrete component feed stream 14. The second component feed stream 14 is bounded, in part, by outer boundary segment 16 and transverse boundary segments 16a. Surface 22 may be formed, for example, by the inner surface of a cylindrical orifice, and is axisymmetric about an axis perpendicular to the plane of the drawing and intersecting that plane at point 26. Surface 24 can be formed by the cylindrical outer surface of a metal shaft which is also axisymmetric about the axis through point 26 (hereinafter axis 26), and is rotatable about that axis as an axis of rotation.

As can be seen from FIG. 1, the two component streams are so distributed within the annular mixing zone between surfaces 22 and 24 that the relative proportions of the two streams varies both as a function of angular position about axis 26 and as a function of radial distance from the axis of rotation. That is, in the circular cross-sectional area A bounded by radii R1 and R2, the ratio of component glass 14 to component glass 12 is lower than in the area segment between R1 and surface 24, while being higher than in the area segment between R2 and surface 22.

Further, the ratio of component glass 14 to component glass 12 differs along radius R1 from the ratio of the two glasses along radius R2, the ratio in the latter case being zero.

Figure 2:
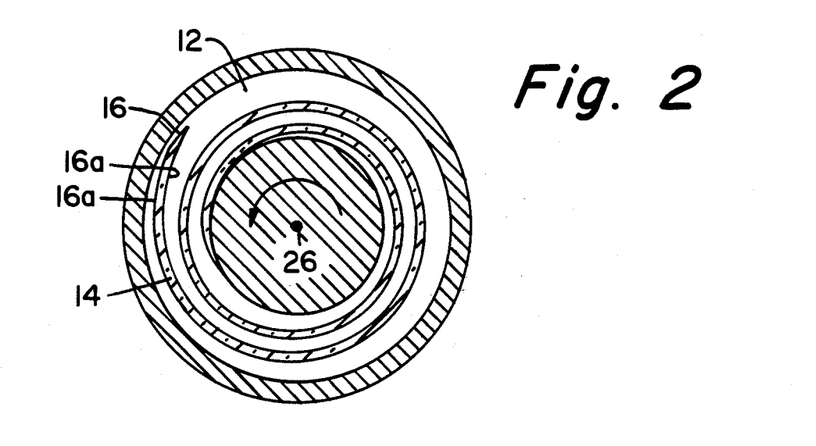
FIG. 2 is a schematic illustration in cross section of the composite feed stream of FIG. 1 after the initiation of multiple layering in accordance with the invention.

The effect of relative rotation of surfaces 22 and 24 on the composite feed stream in zone 20 is illustrated in FIG. 2 of the drawing, which is a schematic illustration in cross section of the elements of FIG. 1 after approximately two complete rotations of inner curved mixing zone surface 24 about axis 26 in the direction shown. Most readily apparent in FIG. 2 is the conversion of component stream 14 into a spirally layered zone within component stream 12 about the axis of relative rotation of the mixing zone surfaces.

The glass distribution observed in FIG. 2 results from the purely circumferential mixing of the component glass streams about axis 26, with no transport or mixing of the glasses radially of that axis. Thus circumferential boundary segment 16 is not extended but boundary segments 16a, being transverse to the circumferential direction of shear in the mixing zone, are extended about the axis of rotation in proportion to the number of relative rotations of surface 24 about axis 26. In principle, this condition will obtain for a indefinite rotation period provided there is little or no transport of material in radial directions across the mixing zone, i.e., in directions perpendicular to the opposing mixing surfaces. Thus a number of spiral layers equal to the number of rotations in the mixing zone can be generated.

The net effect of the mixing or scrolling process illustrated in FIGS. 1 and 2 is redistribution of the component glasses such that the radial composition profile of the processed stream is identical in all directions from the axis of rotation, i.e., compositional discontinuities initially present over any given circumference about the axis are progressively smoothed, and with sufficient rotation, become undetectable. At the same time, because radial transport of glass across planes of shear in the mixing zone are suppressed, the initial integrated radial composition profile of the feed stream is preserved. Thus an initial graded or stepped radial composition profile, e.g. with high-index glass predominating at low radii and low index glass predominating at high radii in the feed stream, is faithfully preserved.

Figure 3:
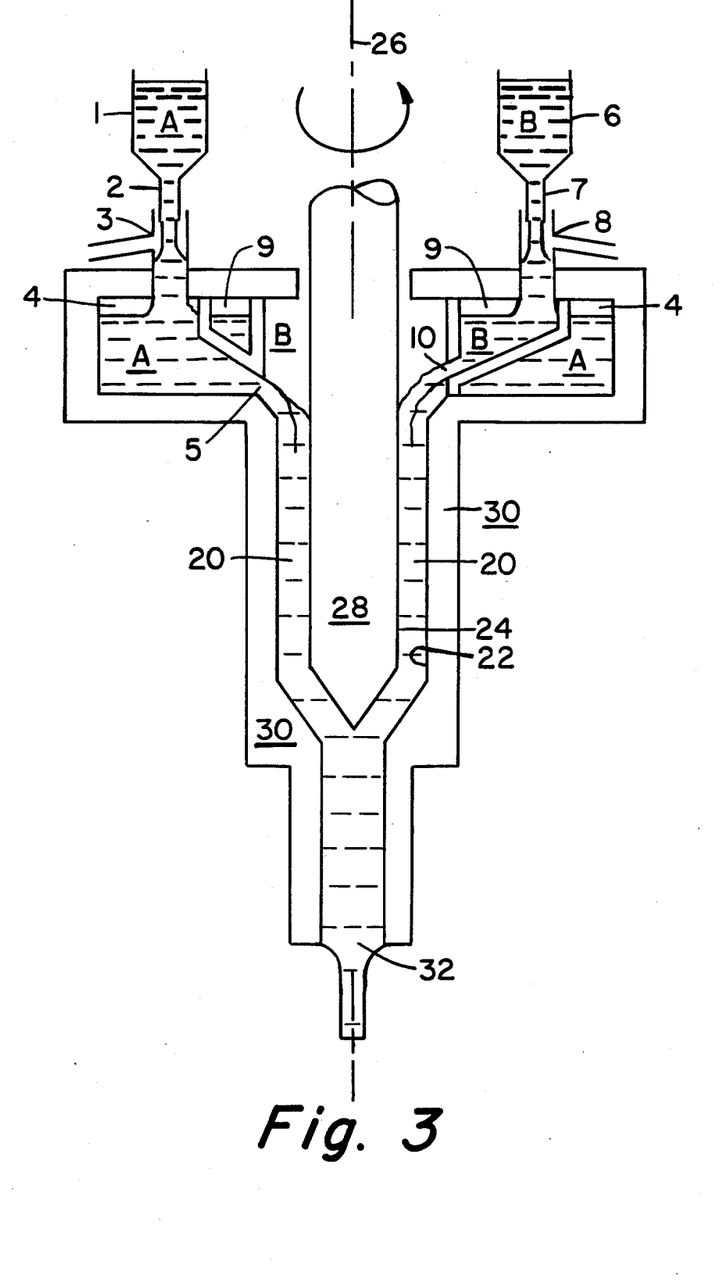
FIG. 3 is a schematic illustration in cross section of apparatus suitable for producing layered glass in accordance with the invention.

FIG. 3 of the drawing is a schematic illustration in cross section of suitable mixing apparatus for producing layered glass as herein described. In this apparatus, termed scrolling apparatus, an annular mixing zone 20 is formed between outer cylindrical surface 24 of a rotatable center member or needle 28 and inner cylindrical surface 22 of a cylindrical mixing container 30 which remains stationary. Glass introduced into annular mixing zone 20 is withdrawn after mixing from bottom orifice 32 in cylindrical container 30.

Referring more particularly to FIG. 3, a primary glass A from glass reservoir 1 is fed into mixing zone 20 via delivery tube 2, which feeds glass into overflow inlet tube 3 leading into a generally toroidal glass distribution chamber 4. Chamber 4 is disposed around rotating needle 28 and feeds glass A into the mixing zone from delivery slots such as slot 5, these delivery slots being positioned circumferentially around the bottom inner wall of chamber 4. Slots of course constitute only one form of delivery means into the chamber and alternative delivery means such as holes or tubes may instead be employed.

At the same time, secondary glass B from reservoir 6 is fed into mixing zone 20 via delivery tube 7, overflow inlet tube 8, and generally toroidal glass distribution chamber 9, which chamber is also disposed around needle 28 but above chamber 4. Glass B flows into the mixing zone from delivery slots such as slot 10, these slots being positioned at selected points around the bottom inner wall of chamber 9 but at a level above the delivery slots from chamber 4.

Figure 4:
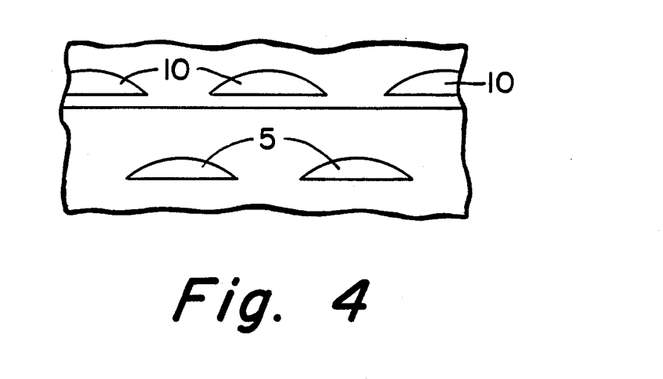
FIG. 4 is a schematic illustration of a glass distribution orifice array useful in the apparatus of FIG. 3.

The relative size, number, shape and positioning of the delivery slots in the scrolling apparatus are selected to achieve a selected radial distribution of component glasses A and B as the combined feed stream enters the top of mixing zone 20. FIG. 4 of the drawing shows one possible arrangement for slots 5 and 10 indicated in FIG. 3. FIG. 4 is a partial schematic view, not in full perspective, of a 180-degree cutaway section of the inside wall of the cylindrical mixing chamber shown in FIG. 3, taken at the level of glass delivery slots 5 and 10 and above mixing zone 20. As suggested by FIG. 4, a full-circle view of the entire inner wall at this level would show four equally spaced delivery slots from each of distribution chambers 4 and 9 positioned about the circumference of the inner wall of each distribution chamber, the upper slots being shifted 45° from the lower slots along the circumference of the chamber.

As is evident from FIGS. 1 and 2 hereinabove described, the degree of layering in glass drawn from bottom orifice 32 of the apparatus in FIG. 3 depends on the combined flow rate of glasses A and B through annular mixing zone 20, as well as upon the rotation rate of needle 28. At low glass flow rates and/or at relatively high rates of rotation of the needle, substantial spiral intermixing of glasses A and B will be accomplished prior to exiting the mixing zone 10, and glass with a very fine layer structure will issue from orifice 32. With sufficiently low flow rates and/or rapid rotation of the center member, the spiral layering can become sufficiently fine that individual layers can no longer be discerned by ordinary optical techniques, yet the desired composition profile across the diameter the withdrawn glass rod may be retained, provided only that mixing of the portion of the glass stream resident in zone 20 is not continued for such a prolonged period or under such conditions that lateral intermixing of glasses A and B, i.e., transport of significant amounts of either of glasses A and B in directions transverse to axis 26, occurs. In this respect it is important that shearing surfaces 22 and 24 be relatively smooth and unbroken, ie., free of holes and protuberances, so that turbulence and/or secondary flows causing undesirable radial flow or non-linear vertical flow in the mixing zone is avoided. Redistribution in accordance with the present process thus relies solely on liquid-liquid shear, as impressed on the feed stream by the walls of the annular mixing zone.

Figure 5:
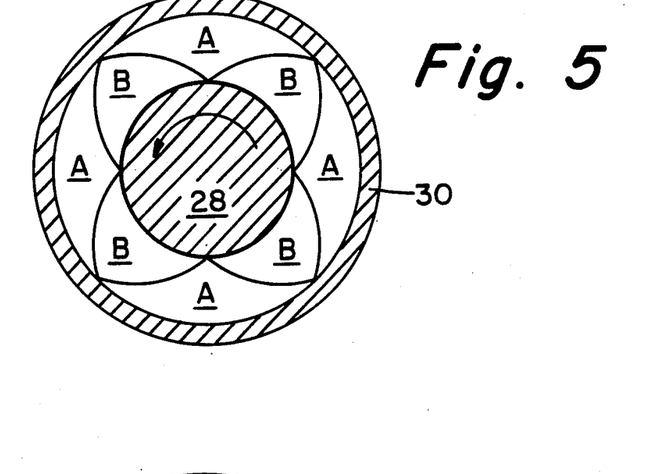
FIG. 5 is a schematic illustration of a composite glass feed stream provided in accordance with the invention.

An example of an actual design distribution for a composite glass feed stream to be introduced into an annular mixing zone such as zone 20 of FIG. 3 is schematically illustrated in FIG. 5. The design distribution comprises a primary component stream A into which is introduced a second group of component streams B, streams A and B constituting molten glass of differing composition with glass B consisting of a relatively high-refractive-index glass and primary glass A being a glass of relatively low refractive index. These component streams form a composite feed stream which is introduced into the annular space between central rotatable member 28 and circumferential cylinder wall 30 in FIG. 3, the mixing zone thus being bounded by the curved outer surface of central member 28 and the curved inner surface of cylindrical container 30.

Referring again to FIG. 5, the distribution of high-index glass B and low-index glass A in the mixing zone is such that the relative proportion of glass B, circumferentially integrated, increases from approximately zero at the surface of container 30 to approximately 100% at the surface of needle 28. This integrated radial profile will be preserved as spiral layering of the glass commences.

Figure 5A:
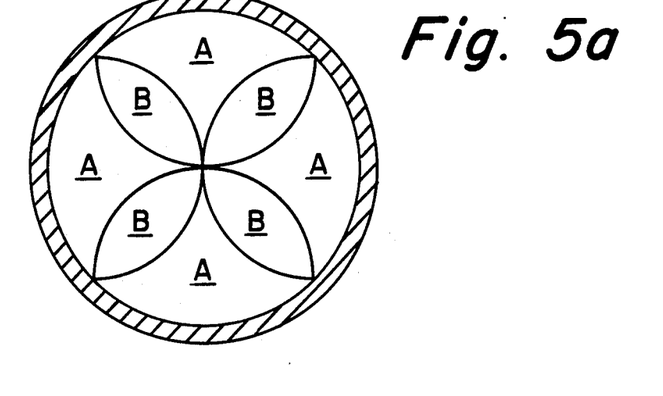
FIG. 5A is a schematic illustration of an unmixed glass product stream resulting from the feed stream of FIG. 5.

In a case where the composite feed stream comprising component streams A and B shown in FIG. 5 traverses the annular mixing zone without rotation of member 28 or 30, the design distribution of FIG. 5 issues from the bottom orifice substantially as shown in FIG. 5a. This theoretical distribution can be distorted, for example, where variations in delivery slot size cause changes in the relative amounts of glass flow through the mixing zone. However, circumferential redistribution of the glass in the course of scrolling advantageously tends to correct some of these possible distribution defects and to produce a product stream exhibiting excellent symmetry about the rotation axis.

Figure 6:
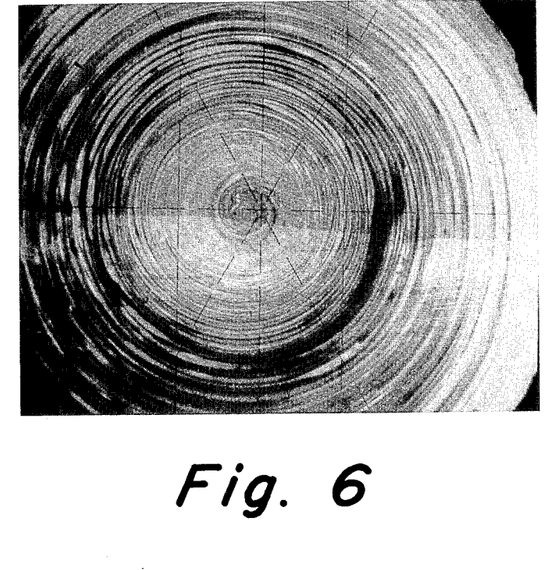
FIG. 6 is a photomicrograph of a mixed glass product stream resulting from the processing of a composite glass feed stream.
Figure 7:
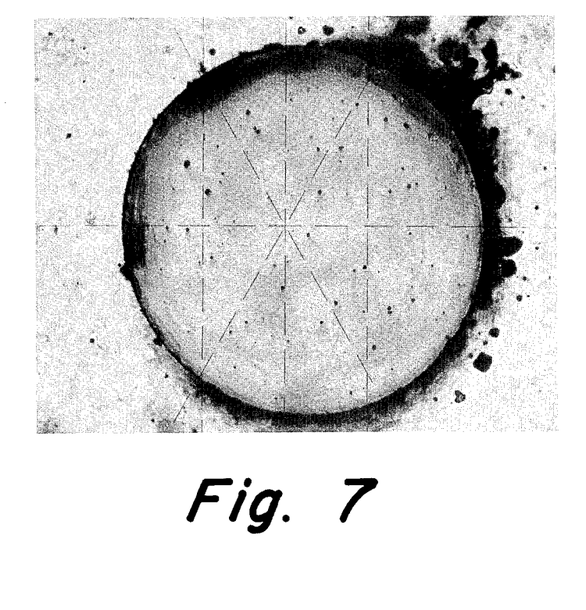
FIG. 7 is a photomicrograph of a further mixed product stream resulting from the processing of a composite glass feed stream.

FIGS. 6 and 7 of the drawing are optical photomicrographs, taken at magnifications of 40-50×, of cross-sections of small glass rods drawn from the bottom orifice of apparatus such as schematically illustrated in FIG. 3, when supplied with a design distribution such as illustrated in FIG. 5. The spiralling shown in the photomicrograph of FIG. 6 taken at a magnification of 40×, is typical of that exhibited by glass rod produced from such apparatus while being operated at a needle rotation speed of approximately 3 rpm, and is characterized by a structure wherein the spiral layering is clearly discernible. In FIG. 7, showing similar glass rod drawn under the same conditions of glass distribution and flow, but with the apparatus operated at a needle rotation speed of 35 rpm, no discernible spiralling appears and the glass has a layer-free structure when examined at a magnification of 50× as shown. Nevertheless, the rod of FIG. 7 retains a refractive index distribution across its diameter having the same overall curvature as the integrated profile which would be exhibited by the rod shown in FIG. 6.

The invention may be further understood by reference to the following detailed example which, however, is merely illustrative of the invention and not limiting with respect thereto.

Example I

The method of the invention is utilized to manufacture multilayer glass rod exhibiting a refractive index gradient across the diameter thereof. For this purpose, two different glasses are provided. The first or primary glass, termed glass A, is a relatively low refractive index glass having a composition consisting in parts by weight of about 65.3 parts $SiO_2$, 11.9 parts $K_2O$, 8.0 parts $Na_2O$, 7.6 parts ZnO, 3.9 parts $B_2O_3$, 2.3 parts CaO, 0.5 parts PbO, 0.4 parts $As_2O_3$, and 0.2 parts $TiO_2$. This glass will be supplied to the mixing zone in a manner such that it will predominate in the relatively low-refractive-index peripheral regions of the graded-index rod. A second glass, termed glass B and having a relatively high refractive index is also provided consisting in parts by weight of about 62.3 parts $SiO_2$, 15.1 parts $TiO_2$, 17.5 parts $Na_2O$, 4.8 parts $Al_2O_3$, 0.15 parts $As_2O_3$, and 0.15 parts $Sb_2O_3$. These glasses have similar physical properties, glass A having a softening point temperature of about 682° C. and a thermal expansion coefficient of about $100 \times 10^{-7}/°C.$, while glass B has a softening point temperature of about 714° C. and a thermal expansion coefficient of about $89.1 \times 10^{-7}/°C.$ over the range 0°–300° C.

These two glasses are supplied to scrolling apparatus having a configuration substantially as shown in FIG. 3 of the drawing. The primary glass, denominated glass A, is supplied to the lower distributor chamber from its melting unit at a flow rate of approximately 5 lbs. of glass per hour, while the secondary or high-index glass is supplied to the upper distribution chamber from its melting unit at approximately the same rate of 5 lbs. per hour.

The annular chamber in which spiral mixing of glasses A and B is accomplished is formed by an outer cylindrical wall (as wall 30 in FIG. 3) of approximately 4″ diameter and having a tapered conical bottom section, and an inner rotating needle (as member 28 in FIG. 3 of the drawing) approximately 2¾″ in diameter, also with a tapered end portion terminating at the bottom of the mixing zone. The bottom orifice of this mixing chamber feeds a delivery tube having a diameter of approximately 1⅛″ diameter and a length of 14″.

Provision is made for electrically heating the scrolling apparatus at several points around the glass distribution chambers, as well as the glass inlet tubes, the mixing chamber wall, and the glass delivery tube. By controlling the temperature of glasses A and B as delivered to the scrolling apparatus, and the temperatures of the distribution chambers, mixing zone, and delivery tube, the viscosity of the glasses in the apparatus, and therefore the rate of delivery of multilayer glass from the bottom orifice, may be controlled.

To commence the production of multilayer glass rod, the primary glass A is melted at a temperature of approximately 1325° C. cooled to 1020° C., and then delivered to the annular distribution chamber above the mixing zone at a temperature of approximately 995° C., while the secondary or high-index glass, melted and cooled in the same way, is delivered to the annular distribution chamber at a temperature of about 960° C.

As glass flow is first commenced, there is no rotation of the needle within the annular mixing zone. The temperature within the mixing apparatus is controlled to achieve a glass viscosity of approximately 5000 poises therewithin, such that the delivery rate of glass from the bottom delivery tube is about 8 lbs. of glass per hour. Excess glass flow from the melting units for glasses A and B is diverted by overflow from the inlet tubes (as tubes 3 and 8 in FIG. 3) prior to entering the mixing unit. To achieve the desired glass flow through the mixing unit with these glasses, temperatures in the range of 960°–995° C. are maintained within the mixing zone and delivery tube. After a steady flow of glass from the melting units through the distribution chambers, mixing zone and delivery tube has been achieved, rotation of the needle is commenced and gradually increased to approximately 12 rpm. The layered glass cane issuing from the delivery tube prior to and during the commencement of needle rotation is drawn into diameters of ⅛″, 1/16″, and 1/32″.

After the samples have been drawn, the rotation speed of the needle is increased in set increments to a maximum speed of 45 rpm. At each speed, further samples of the glass rod produced are set aside for later analysis.

Samples of graded index glass cane produced as described are subjected to analysis by optical and electron microscopy, and to refractive index profile analysis. FIG. 6 of the drawing shows the spiral layered pattern produced at the commencement of needle rotation as the needle speed approaches 3 rpm. The spiral layering of the two glasses produced in the mixing zone is readily apparent in the cane sample.

FIG. 7 of the drawing is a similar micrograph taken of glass cane drawn while the apparatus was operating at a needle speed of 35 rpm. The layering structure in this sample has become sufficiently fine that no actual layers can be detected by microscopic examination.

Figure 8:
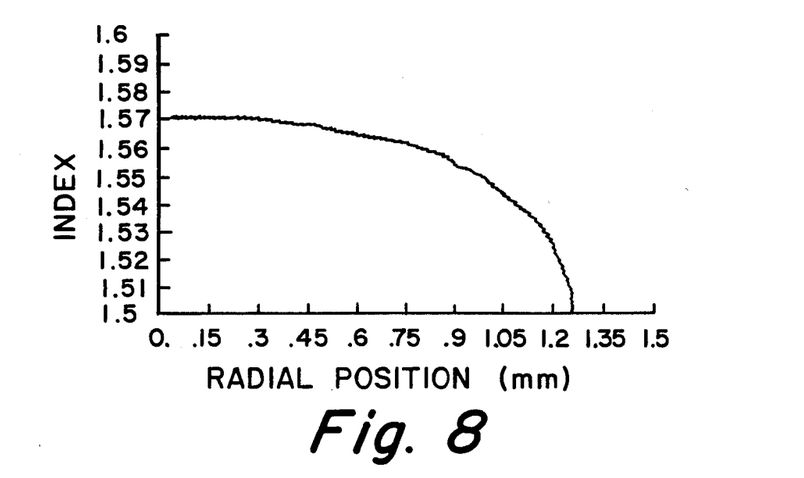
FIG. 8 is a refractive index plot, as a function of radius, across a glass cane product provided in accordance with the invention.

FIG. 8 of the drawing is a refractive index profile plot taken from a cane sample produced at a rotation speed of approximately 33 rpm wherein, as in FIG. 7, the spiral layers would no longer be optically discernible. As is evident from FIG. 8, a relatively smooth graded-index profile, approximating that theoretically anticipated from the radial distribution of the component feed streams entering the mixing zone, is achieved.

The foregoing example illustrates the application of the invention to the forming of molten glasses in a continuous, hot-forming process. However, the invention is not limited in its application to such continuous processes, but could also be used in a batch mode to obtain a spirally layered glass or ceramic preform, or even a spirally layered preform from viscous solutions or suspensions of glass-forming or other materials. For example, two viscous solutions or suspensions capable of forming glasses upon solvent removal and heat treating could be introduced into a suitably partitioned container so that each of the component solutions was disposed in a suitable configuration about a central, rotatable member therein. After the solutions had been introduced, removal of the partitions and rotation of the central member could produce spiral layering o scrolling of the glass solutions, after which gelling or other solidification of the solutions and removal of the liquid phases could be accomplished. The generation of the desired index profiles by viscous shear rather than by turbulent and/or secondary flow mixing has substantial advantages over prior art techniques in terms of the smoothness of the resulting product microstructure which may be obtained.

The invention also has application in the forming of composite spirally layered products such as glass-metal or metal-ceramic products useful for structural and/or electrical applications. For example, a glass-metal capacitor could be provided by introducing suspensions of glass along with metal solutions into a suitably partitioned container or continuous mixing device, again introducing the component liquids in appropriate configurations to achieve the desired distribution of layers in the final product. After the solutions had been introduced, rotation of the central member to achieve spiral layering, followed by gelling or other solidification of the suspensions or solutions and removal of liquid phases could be accomplished. In either of these two batch approaches to the manufacture of spirally layered products, the layered bodies produced by solidification of the spirally layered liquids could of course be redrawn or otherwise reshaped into final products of appropriate dimensions and configuration.

Of course the foregoing examples are merely illustrative of applications for the present invention, and numerous variations and modifications thereof within the scope of the appended claims will become apparent to those skilled in the art.

We claim:

1. A method for the continuous manufacture of a glass article having a preselected refractive index profile which comprises the steps of:
   (a) providing a mixing zone for the hear mixing of molten glass, the mixing zone including an annular gap between opposing, closed surfaces, at least one of which surfaces is a curved axisymmetric surface which can be rotated with respect to the opposing surface about a rotation axis coinciding with its axis of symmetry,
   (b) introducing into the mixing zone a composite molten glass feed stream, the composite feed stream comprising two or more component streams of differing composition, the component streams being geometrically distributed within the composite stream entering the mixing zone such that the relative proportions of at least two of the component streams varies both as a function of angular position about the axis of rotation and as a function of radial distance from the axis of rotation;
   (c) rotationally moving the curved axismmetric surface with respect to the other surface while in contact with the composite feed stream for a time sufficient to obtain circumferential mixing of the composite feed stream and spiral layering of at least two of the component streams about the axis of rotation, but insufficient to cause radial glass redistribution and homogenization of the feed stream across the annular gap; and
   (d) withdrawing the mixed composed glass feed stream from the mixing zone and cooling the glass to a solid glass article.

2. A method in accordance with claim 1 wherein the mixing zone is disposed for the downward flow of molten glass therethrough, wherein the composite molten glass feed stream is continuously introduced into the top of the mixing zone, and wherein the mixed composite glass feed stream is continuously withdrawn from the bottom of the mixing zone.

3. A method in accordance with claim 2 wherein the mixing zone includes a cylindrical annular gap formed between opposing coaxial cylindrical inner and outer surfaces.

4. A method in accordance with claim 2 wherein the mixing zone comprises an annular gap formed between opposing, coaxial, conically tapered inner and outer surfaces.

5. A method in accordance with claim 4 wherein the inner and outer surfaces have the same taper angle.

6. A method in accordance with claim 1 wherein the relative proportions of at least two of the component streams varies as a graded function of distance along a radius from the axis of rotation over at least a portion of said radius.

7. A method in accordance with claim 6 wherein the mixed composite glass feed stream withdrawn from the mixing zone exhibits a refractive index gradient across at least a portion of the diameter thereof.

8. A method in accordance with claim 1 wherein the relative proportions of at least two of the component streams varies as a step function of distance along a radius from the axis of rotation.

* * * * *